April 22, 1969        S. A. PETERSON ET AL        3,439,651
METHOD OF CONTROLLING THE LAYING HABITS OF POULTRY
Filed March 1, 1967
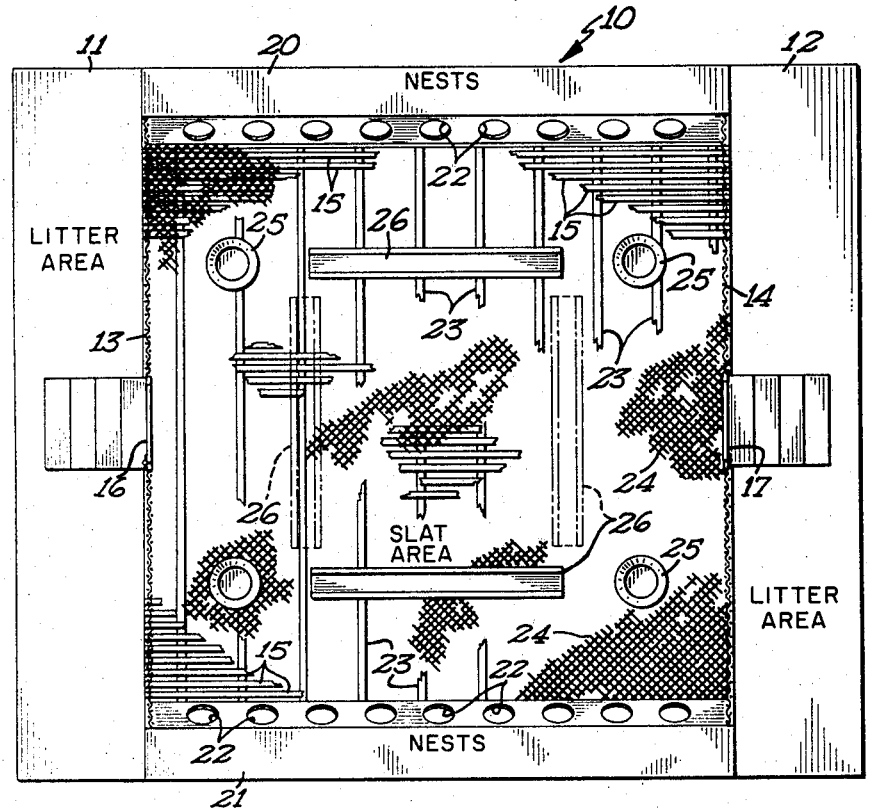
INVENTORS
SEYMOUR M. PETERSON,
JOHN W. GRANATH
BY Schroeder, Siegfried
& Ryan    ATTORNEYS United States Patent Office 3,439,651
Patented Apr. 22, 1969

3,439,651
METHOD OF CONTROLLING THE LAYING HABITS OF POULTRY
Seymour A. Peterson, Dassel, Minn., and John W. Granath, Danville, Ind., assignors to Storm Industries, Inc., Dassel, Minn., a corporation of Minnesota
Filed Mar. 1, 1967, Ser. No. 619,699
Int. Cl. A01k 31/00, 45/00
U.S. Cl. 119—21                                    3 Claims

ABSTRACT OF THE DISCLOSURE

This disclosure is directed to a method of establishing the laying habits of a poultry flock. It is known generally, that a poultry flock will lay the greatest number of eggs in the nests if the flock is confined after the flock starts to lay rather than beforehand. It has been discovered that the number of eggs laid in the nests by a flock may be broadened to a maximum rate by disrupting the environment of the flock when the daily production rate is approximately 10–15 percent of the total flock number and continuing such disruption until sometime short of reaching peak production. The environmental change may be accomplished by upsetting the schedule of the flock in a controlled house.

---

This invention is directed to a method of poultry egg production and more particularly to decreasing the number of eggs laid on the floor by a poultry flock.

It has been recognized by others that certain structure may be used to insure that poultry flocks are subjected to a traffic pattern which takes them by the nests and thus a very high percentage of eggs are supposed to be laid in the nests as opposed to the eggs which are laid on the floor or in the litter. Such a teaching is found in the Kaegebein Patent Re. 25,714. The Koegebein patent makes use of a house having a litter area adjacent to an area in which the flock may be confined on a wire bottom or slatted floor. Kaegebein teaches that locating the nests along the dividing wall or barrier separating the litter areas and the slatted floor will cause he birds to move past the nests in getting to and from the litter area and thus the birds will be inclined to do their laying in the nests rather than in the litter. In other words, Kaegebein's teaching is directed to placing the nests at a location adjacent the door or access panels to force the birds to move directly past the nests.

Laying flocks are particularly aware of any change in their surroundings and a change in the surroundings will generally arouse and intensify the curiousity of the birds. They generally approach some new object and inspect it with caution but apparently the bird must find out if the new thing has any particular meaning with regard to its food or place of shelter, or whether it is a dangerous object or not. For instance, it will be seen that birds will generally flock to a new nest that has been added to a laying area after production has reached a normal production with the result being that the newly added nest will get from two to three times the normal number of eggs that the other nests provide. In other words, enough of the birds will change their habits to explore the new thing added. It has also been found that housing the birds after they have started to lay generally produces a lower rate of eggs laid in the litter or on the floor than when they are confined before starting their laying habits.

Generally when a hen has begun to lay eggs, the hen will continue to lay in the same place until something happens to cause the hen to change her habit and lay some place else. The real concern is for less aggressive birds which must also get into the nests and since the birds are less aggressive, they are not apt to go to any trouble to get in a laying nest. Because the less aggressive birds will not go through an unfriendly group of birds or over the obstacles in the form of waterers, feeders, and other man-made objects, the bird does not get to the nest when it is desirable. In a less dense operation, that is, one where the habitual travel pattern of each group is shaken up or changed, a bird will move through a longer path and increase its distance of travel as the birds become more dispersed or mixed up.

It is therefore a general object of this invention to provide an improvement in the method of establishing the laying habits of a poultry flock to produce fewer eggs on the floor and more eggs in the nests.

It is still another object of this invention to provide a method of establishing the environment of a poultry flock during their daily laying hours.

It is a more specific object of this invention to provide a method of decreasing the number of floor eggs laid by a poultry flock by upsetting flock routine during the laying hours.

It is still another object of this invention to provide a method of increasing the number of eggs laid in the nests of a poultry flock by changing the hours during which the flock is forced into closer proximity to the nests at a critical time during the laying cycle of the flock.

These and other objects and advantages of the invention will more fully appear from the following description, made in connection with the accompanying drawing, wherein like reference characters refer to the same or similar parts, and in which the figure is a diagrammatic plan view of a poultry house having a controlled environment.

In carrying out the teachings of the present invention, resort will be had to the drawing showing a structure which may be used. As shown in the figure, the outline of a poultry house 10 is shown in which a pair of litter areas 11 and 12 are secured along the sides of the poultry house. The litter areas extend adjacent the sides of the house 10 and provide a scratching area for the birds. A pair of walls 13 and 14 are erected upwardly to intersect the roof line of the building so that a complete wall is formed between the litter area and the central area which is a slat area 15. The walls may be erected from wire mesh or other suitable means admitting light and providing ventilation. In the center of each of the walls 13 and 14, are formed a pair of doorways having a pair of doors 16 and 17 which control the entry and exit of the birds from the litter area to the slat area. Across the ends of the slat area 15, are secured a bank of nests 20 and 21, each nest having a plurality of openings 22 providing access to the nest. The slat area is formed of a number of supporting members such as those designated number 23 over which a wire covering 24 may be secured or other slats may be extended either parallel to those designated 23 or perpendicular thereto to form a complete floor having openings therein. The floor is generally raised in the slat area so that a dropping pit may be formed underneath the floor, thus providing a clean area in the slat area. Also situated in the slat area, are the poultry waterers 25 and feeders 26. As will be explained later, the feeders may be moved to the position shown in the dotted lines.

By carrying out the steps enumerated below, it will be found that an improved method of establishing the laying habits of a flock is set forth. As explained earlier, the laying flock is first confined to a housing area either before or after they have started laying. When the daily flock production laying rate equals approximately 10–15 percent of the total number in the poultry flock, the flock is then confined to the nesting area and the birds which have been laying in the litter area are subjected to a new pattern of dominance. It is during this period that they move about more freely and as a result thereof, more of the birds find their way to the nests. It has been found that the best results generally are obtained when the flock remains confined until the flock reaches a laying rate just short of its peak production, which may be approximately 70–80 percent of the flock total.

Such conditions may be maintained by the arrangement shown where the flock is first confined to the poultry house before or after the poultry flock starts laying. During this period of time, some eggs will be laid in litter areas 11 and 12 and some on the floor in the slat area 15. During this confinement period of time, the operator will pick-up the floor eggs, and also put those birds found in the litter areas in the slatted area during or shortly before the roosting hours or period of darkness. Subsequently when the flock production laying rate equals approximately 10–15 percent of the total number in the poultry flock, the birds are confined to the slatted area 15 each day until some time in the mid-afternoon which may be approximately 3:00 p.m. In other words, the birds are confined to the slatted area from the time the birds go to roost until they are again allowed into the litter areas by closing doors 16 and 17 during he roosting (darkened) and laying (illuminated) hours. When the daily laying rate is just short of reaching its peak, which may be approximately 70–80 percent of the flock total, the time for keeping doors 16 and 17 closed will be shortened by approximately one or two hours each day from the mid-afternoon period until they are opened at a mid-morning time, or approximately 9:00 a.m. Since the birds are confined to an area which contains the nests 20 and 21, the birds have a greater tendency to lay in the nests rather than on the floor and the number of floor eggs produced is reduced substantially.

Thus it will be seen that there has been disclosed herein, a new and novel method of decreasing the eggs laid on the floor by a laying flock. By upsetting the normal routine of the laying flock at a particular time, that is, when the production rate reaches 10–15 percent of the production of the poultry flock, more eggs will be laid in the nests and the maximum number of nest eggs will be obtained if the normal routine is so upset until the birds are just short of reaching their normal peak laying rate, which is generally 70–80 percent of the production of the flock.

It will, of course, be understood that various changes may be made in the form, details, arrangement and proportions of the parts without departing from the scope of the invention which consists of the matter shown and described herein.

What is claimed is:
1. The method of establishing the nest laying habits of a poultry flock in a poultry house having a slatted floor area containing nests and a litter floor area adjoining the same and separated by a wall having doors formed therein providing access to the slatted floor area comprising the steps of:
 (a) confining the poultry flock to the poultry house and opening the doors in the walls for substantially the entire daily laying period;
 (b) closing the doors to restrict the poultry flock to the slatted floor area during the flock daily laying hours when the laying rate equals approximately 10–15 percent production of the poultry flock;
 (c) and subsequently opening the doors earlier each day commencing at any time when the laying rate has not yet reached its peak.

2. The invention as set forth in claim 1 wherein the peak production rate is generally 70–80 percent.

3. The invention as set forth in claim 1 wherein the time at which the doors are closed is changed from a morning closing time to an afternoon closing time when the laying rate is approximately 10–15 percent.

References Cited
UNITED STATES PATENTS

| | | | |
|---|---|---|---|
| Re. 25,714 | 1/1965 | Kaegebein | 119—21 |
| 506,831 | 10/1893 | Ridings | 119—21 |
| 1,212,289 | 1/1917 | Van Ackeren | 119—21 |

ALDRICH F. MEDBERY, *Primary Examiner*